May 8, 1928.

W. E. RUPLEY 1,668,783

ELECTRIC WELDING APPARATUS

Filed April 13, 1925

Inventor
William E. Rupley
By Lyon & Lyon
Attorneys

Patented May 8, 1928.

1,668,783

UNITED STATES PATENT OFFICE.

WILLIAM E. RUPLEY, OF LOS ANGELES, CALIFORNIA, ASSIGNOR TO WESTERN PIPE & STEEL COMPANY OF CALIFORNIA, OF SAN FRANCISCO, CALIFORNIA, A CORPORATION OF CALIFORNIA.

ELECTRIC WELDING APPARATUS.

Application filed April 13, 1925. Serial No. 22,832.

This invention relates to welding apparatus, and is more particularly directed to an apparatus for forming either a lap or butt weld along a longitudinal seam so as to form seamless pipe or tubing. While this invention may be particularly directed to an apparatus for welding longitudinal seams of pipe, it will be obvious that the apparatus hereinafter set forth might, by slight modifications, be employed for either butt or lap welding other straight seams.

In welding pipe for the purpose of providing a seamless connection, by methods herebefore in common practice, burns often occur through the welded connection which renders the pipe connection, as well as the pipe structure, weak at these points, and this difficulty has been encountered in both lap and butt welding, the welded material having been burned right through, either causing a hole at this point or rendering the pipe connection and pipe structure very insecure.

It is, therefore, an object of this invention to provide an apparatus for welding longitudinal seams in which means are provided for preventing the burning through of the material so that a perfect, uniform connection may be made between two metallic portions of the material so welded.

Another object of this invention is to provide an apparatus whereby longitudinal seams are automatically welded so as to remove the danger encountered, when the pipes are manually welded, of such burning by providing an apparatus which is automatically driven to weld the connected joint at a predetermined and definite rate.

An object of this invention is to provide a clamping means for securely holding the portions of material to be welded during the welding operation so that the materials to be welded will be held in perfect alignment so that a uniform and straight welded seam may be obtained.

Another object of this invention is to provide adjustable clamping means for the portion or portions of material to be welded so that a welded seam of predetermined width may be obtained.

Another object of this invention is to provide composite adjustably spaced welding jaws and welding die or anvil, the temperature of which may be controlled without increasing the liability of the welding jaws or anvil to crack.

Another object of this invention is to provide a manner of mounting the welding electrodes so that the same may be positively driven along the surface to be welded at a uniform predetermined rate.

Other objects and advantages of this invention will be apparent from the following detailed description of a preferred embodiment thereof, as illustrated in the accompanying drawings, in which drawings Fig. 1 is a side elevation of a welding apparatus embodying this invention.

Figure 1:
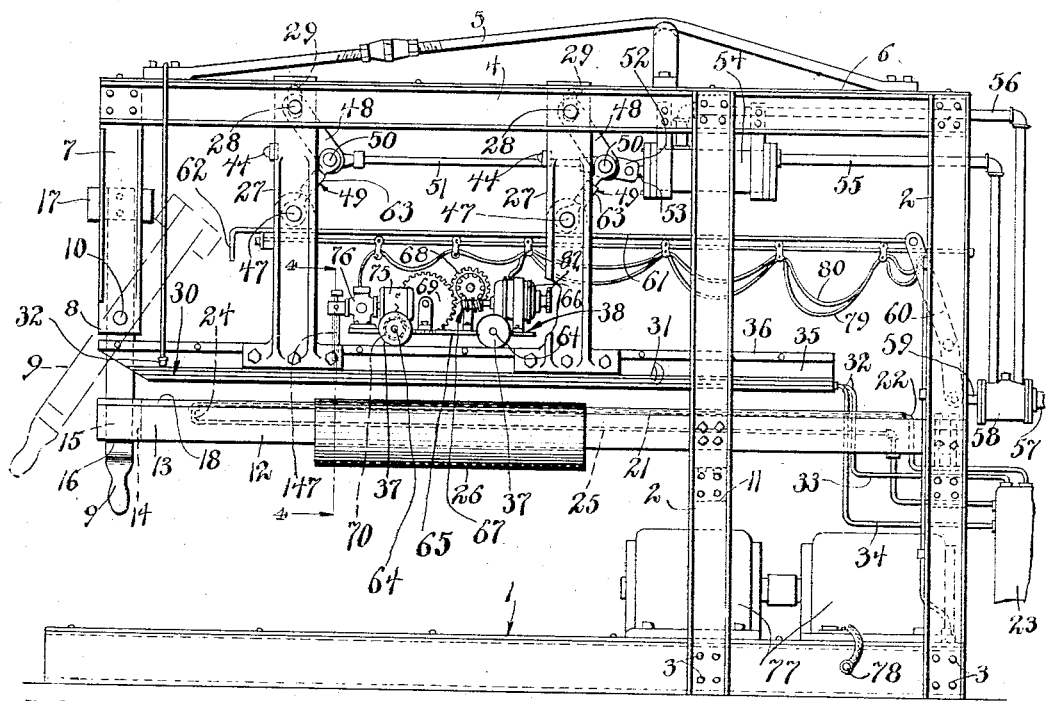
Figure 2:
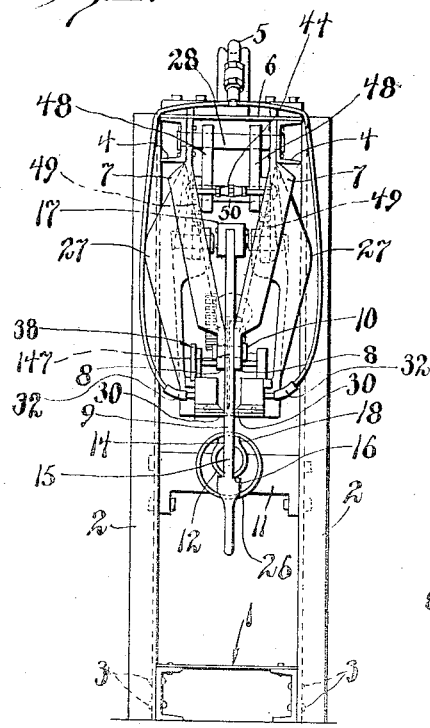
Fig. 2 is an end elevation thereof looking from the left to the right in Fig. 1.

In the preferred embodiment of this invention shown in the drawings, 1 indicates a standard constructed of channel irons to which uprights 2 are secured by any suitable means such as the bolts 3. Secured to the upper end of the apparatus 2 are channel irons 4 which form the upper frame member of this apparatus. The truss arm 5 and cross plates 6 are provided for reinforcing and holding the channel irons 4 firmly in position.

Secured to the opposite end of the members 4 are a pair of inwardly bent supporting members 7 to the lower end 8 of which members a locking bar 9 is pivoted, as illustrated by a pin 10. Mounted between the uprights 2 are spacing members 11 to which spacing members 11 an anvil supporting member 12 is secured, which member 12 may be of cylindrical cross section. Means are provided for holding the member 12 rigid at its outer or non-supported end 13, which means include a slot 14 formed in the member 12 into which the lower end 15 of the locking bar 9 is adapted to fit so that the underside of the member 12 rests upon shoulders 16 formed on the locking bar. The upper or opposite end of the locking bar 15 is provided with a weight 17 so as to counter-balance the locking arm 9. Formed integral with the anvil supporting member 12 is an anvil receiving boss 18 having a longitudinally extending slot 19 formed therein adapted to receive the anvil member 20, which anvil member 20 is preferably formed of copper or similar soft metal. As illustrated, the anvil member 20 is dove-tailed within the slot 19 so that the same will be securely held in position. A bore 21 extends the length of the anvil member 20 and is connected at one end with a conduit 22 which conduit 22 is connected at its opposite end with a water supply tank 23 so that water is forced through the bore 21 and the bore 21 is connected at its opposite end as illustrated at 24 to a return water conduit 25, which returns the water to the water supply tank 23.

Means are provided for clamping the article to be welded, such as the pipe 26, rigidly to the anvil member 20, which means are preferably as follows:

Arms 27 are secured to the channel irons 4 on pins 28, which pins 28 pass through slots 29 formed in the upper end of the arms 27. Secured to the lower end of the arms 27 are welding jaws 30 which welding jaws 30 extend substantially the length of the anvil 20, each of which welding jaws 30 is constructed in sections 31, three of which sections are shown. However, it is understood that these welding jaws might be constructed of any suitable number of sections, and are composed of sections of material such as copper to avoid breaking or cracking of the jaws when the same are subjected to rapid temperature changes.

Formed within each jaw 30 is a conduit 32, one of which conduits 32 is connected to a water supply tank 23 through a conduit 33 and the two conduits 32 are connected together at their opposite ends so that the water flows through one conduit and back through the other conduit through a lead 34 back into the water supply tank 23.

Mounted on the jaws 30 are track blocks 35, to one of which blocks 35 a plain strip of material 36 is secured so as to provide a runway for one pair of wheels 37 of the electrode conveying car 38 and to the other track block 35 is secured a block 39 having a recess 40 into which the rims 41 of the opposite pair of wheels 42 of the car 38 fit. The arms 27, mounted upon the pin 28, are adjustable to or from one another so as to vary the width of the weld formed between the ends 43 of the jaws 30. The particular means illustrated for accomplishing this adjustment comprises turn buckles 44, the opposite ends of which are secured to the respective arms 27. By this means the arms 27 may be moved to or from each other so as to either spread apart or bring together the jaws 30. The jaws 30 are tapered as illustrated at 46 so as to permit the welding electrode 147 to be admitted therebetween in close proximity to the anvil 20. Mounted upon the pins 28 and 47 are toggle links 48 and 49 respectively, which toggle links are connected together at their opposite ends by pins 50 which pins 50 are connected by means of a rod 51. Secured to the rearward pin 50 is a link 52 which connects a piston rod 53, which piston rod 53 is connected to a piston (not shown), mounted within the cylinder 54. The cylinder 54 is supplied with fluid pressure through the conduits 55 and 56 from a conduit 57 which connects with a pressure pump (not shown).

The conduits 55 and 56 connect with a valve chamber 58 which has a reciprocating piston valve (not shown) mounted therein so as to either admit the fluid pressure through the conduit 55 or the conduit 56, depending upon whether it is desired to force the jaws 30 downward upon the pipe 26 or whether it is desired to elevate the jaws 30 to allow the removal of the pipe 26.

The piston valve is connected to a piston rod 59 which is connected through the links 60 to an actuating arm 61 which extends to the forward end of the welding apparatus and is provided with a handle 62 so that the piston valve may be easily reciprocated to its required position. The toggle links 49 are provided with turn buckles 63 so that their length may easily be adjusted.

While I have illustrated the means for hydraulically forcing the upper jaws 30 into engagement with the work, it will be obvious that any other suitable means might be provided so as to apply force to the jaws 30 to force the same into engagement with the work, such as the pipe 26, so as to force the sections thereof, which it is desired to weld together, into perfect alignment.

Figure 3:
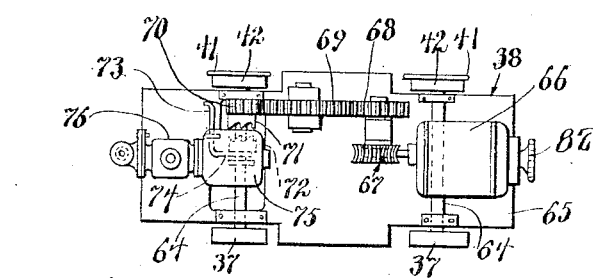
Fig. 3 is a top plan view of an electrode conveying means embodied in this invention.

Means are provided to slowly drive the car 38 along the runway 36 and block 39 during the welding operation, which means are preferably as follows: The wheels 42 and 37 of the cars 38 are mounted on axles 64 which axles are loosely journaled to a platform 65. Mounted upon the platform 65 is a motor 66, herein illustrated as an electric motor, and the drive shaft of which is connected through the reducing gears 67, shown as worm gearing in Fig. 3, to a pinion 68, which pinion 68 is connected by means of an idling gear 69 to a drive gear 70, to which drive gear 70 a clutch gear 71 is affixed, which is adapted to be meshed with a clutch gear 72 slidably mounted upon the forward axle 64 of the car 38. The gear 72 is rigidly secured to the axle 64 by a key (not shown), which key passes through a keyway, likewise not shown, formed in the interior core of the gear 72 so that the gear 72 is slidable upon the axle 64 by means of a lever 73 to mesh with the gear 71. The lever 73 is provided with a ring 74 which fits over a reduced portion of the gear 72 so as to allow the gear 72 to rotate within the ring 74.

Mounted upon the forward end of the car 38 is a second electric motor 75 which drives an electrode feed mechanism 76 of any of the well-known types, so as to automatically feed the carbon electrode 147 into position to form the welded connection. A motor generator 77 generates the proper current for the welding electrodes, one terminal of which generator is connected to the frame work of the apparatus as illustrated at 78, and the opposite terminal is connected through one of the leads 79 to the carbon electrode 147. Conduct of the current for the electric motors 64 and 75 may be supplied from any suitable source.

Means are provided for regulating the speed of travel of the car 38 which means may be of any suitable form, as a gear change similar to that found in a lathe or may be as shown a rheostat 82 connected in series with the motor 66.

Figure 4:
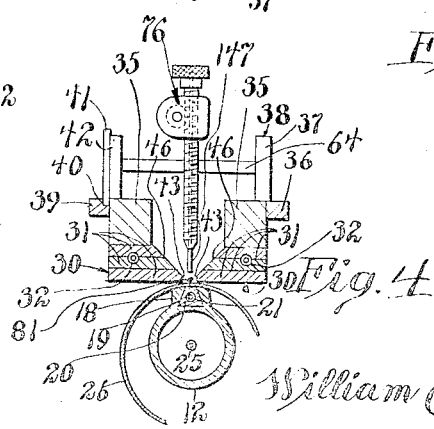
Fig. 4 is an end elevation taken substantially on the line 4—4 of Fig. 1, showing the construction of the welding jaws and welding anvil embodied in this invention.

The operation of this machine is as follows:

The work is placed upon the anvil 20 over the anvil supporting member 12, the handle 62 is pulled to the direction to force the jaws 30 into engagement with the work and by this means the connecting edges of the work are forced into perfect alignment. Water is forced through the conduits 22 and 33 and the motor generator 77 is started, it being understood that the position of the common electrode 47 is first set, and the motors 66 and 75 are then set in operation. The car 38 then conveys the electrode along the surface to be welded as the electrode feeding mechanism 76 feeds the electrode to maintain the proper welding arc. This apparatus is adapted to either form a lap or a butt weld. In the case of the latter, a strip of welding material 81 is thrust upon the surface to be welded, as illustrated in Fig. 4, and in position to form the butt weld. After the work is welded from one end to the other, the handle 62 is forced in the opposite direction so that the jaws 30 are raised from engagement with the work and the lock lever 9 is then released to permit the withdrawal of the work from the anvil 20 in case the work be a pipe, it being understood that after the welding of the surface is completed the operation of the motor electrodes 77 to supply the current to the electrodes is discontinued.

Having fully described the preferred embodiment of this invention, it is to be understood that it is intended that the same should not be limited to the exact construction herein set forth, which may obviously be varied in detail without departing from the spirit of the appended claims.

I claim:

1. In an apparatus of the class described, the combination of a frame, a horizontally extending work support secured to the frame, a welding anvil formed of copper and dove-tailed in a groove formed in the work support and extending substantially throughout the length of the said work support, a pair of vertical movable jaws, means for adjusting the jaws transversely of the said anvil, a welding car driven by a plurality of wheels, means on the car and adapted to be engaged with one of the said movable jaws for guiding the car during the driving thereof and a welding electrode supported by the car.

2. In an apparatus of the class described, the combination of a frame, a horizontally extending work support secured to the frame, a welding anvil secured to the said work support and extending substantially throughout the length thereof, a pair of vertical movable clamping jaw, toggle links secured to the said jaws and to an upper horizontal extension of the frame and adapted to be actuated by a common power mechanism to simultaneously move the jaws to force the same into engagement with the work in the said support to rigidly clamp and align the same, and means for securing the work so held.

3. In an apparatus of the class described, the combination of a frame, a work support extending longitudinally from the frame and being secured to the frame at one end, horizontal frame members spaced vertically from the said work support, a pair of elongated horizontally extending jaws supported by the said upper frame members, and means secured to the said horizontally extending jaws and to the said upper horizontally extending frame members for moving the welding jaws vertically to engage the work positioned on the said work support substantially throughout the length of the said work.

4. In an apparatus of the class described, the combination of a frame, a horizontally extending work support secured to the frame, upper horizontally extending frame members spaced vertically from the said work support, a pair of vertically movable clamping jaws and vertically extendible means secured to the said jaws and to the said upper frame members and adapted to be actuated by a common power mechanism to simultaneously move the said jaws to force the same into engagement with work positioned on the said support to rigidly clamp and align the same, and means for securing the work so held.

5. In an apparatus of the class described, the combination of a frame having a base and an upper horizontally extending section secured to the base by means of vertical frame members between the said base and horizontal sections, a pair of jaws, means securing the said jaws to the said horizontal section so as to hold the jaws from vertical movement, means secured to the said jaws and to the said horizontal section for moving the said jaws simultaneously toward the said work support, and means mounted on the said work support for welding the work so held.

6. In an apparatus of the class described, the combination of a frame comprising a base, vertically extending members secured at points near one end of the base and secured at their upper end to horizontally extending frame members, a work support secured to the said vertical members and the base, and releasably secured at its opposite end to the said horizontal frame members, a pair of vertically movable jaws secured to the horizontal frame members and adapted to be moved vertically to rigidly secure the said work to the support throughout the length of the work and to align the said work, and means for adjusting said jaws transversely of the work support.

Signed at Los Angeles, California, this 6th day of February, 1925.

WILLIAM E. RUPLEY.